Jan. 12, 1937.　　　E. H. ZEITFUCHS　　　2,067,430
VISCOMETER
Filed Dec. 14, 1935　　　2 Sheets-Sheet 1

Inventor
EDWARD H. ZEITFUCHS
by
Attorney

| | A | B | C |
|---|---|---|---|
| VISCOSITY OVER 200 SAYBOLT UNIVERSAL SECONDS | 315 MM | 145 MM | 2.15 MM |
| 45 TO 500 S.S.U. | 315 MM | 145 MM | 1.40 MM |
| 30 TO 50 S.S.U. | 315 MM | 145 MM | .770 MM |

Inventor
EDWARD H. ZEITFUCHS
by  *J. H. Adams*
Attorney

Patented Jan. 12, 1937

2,067,430

UNITED STATES PATENT OFFICE 2,067,430

VISCOMETER

Edward H. Zeitfuchs, Berkeley, Calif., assignor to Standard Oil Company of California, San Francisco, Calif., a corporation of Delaware Application December 14, 1935, Serial No. 54,460

8 Claims. (Cl. 265—11)

This invention relates to apparatus for determining the kinematic viscosity of liquids such as oils, and particularly refers to a modification of the so-called Ostwald viscometer for adapting the same to be used in the routine testing of small samples of oils to give a materially higher degree of accuracy than has been possible with apparatus heretofore used in such routine testing.

The usual types of viscometers used in oil refinery control laboratories, for example, where a very large number of samples are required to be tested daily, are the Saybolt, Engler, Redwood and Barbey instruments. These have been standardized so that commercially acceptable reproducible results are obtainable by the exercise of great care by skilled operators, but are relatively inaccurate, due to the use of a very short tube and to the exposure of a portion of the tube to atmospheric temperature. In modern oil refining practice, however, it has become desirable to obtain the viscosity of liquid samples within closer limits of accuracy than is possible with the type of equipment mentioned, and, in consequence a need has arisen for a routine and easily operable viscometer that will operate on samples of the order of 10 c. c. in volume and which will give an accuracy of measurement within 0.5%.

It is, therefore, an object of this invention to provide an improved modification of the Ostwald viscometer, such as is generically described in the book "The Viscosity of Liquids" by Hatscheck, together with improved means for its adaptation to routine testing, so that a complete single determination may be made in ten minutes or less and with a minimum of manipulations of the equipment.

Another object is to provide an improved viscometer that is readily and economically manufactured to standard dimensions and which is rugged enough to withstand the rough and rapid usage to which it may be subjected in a routine testing or process control laboratory.

Another object is to provide an improved mounting and aligning or leveling means for a viscometer tube of this nature.

Another object is to provide an improved viscometer tube that requires no preliminary measurement of volume of the sample, or special equipment or precautions for introducing the sample into the tube.

These and other objects and advantages will be more fully apparent from the following description and from the accompanying drawings, which form a part of this specification and illustrate a preferred embodiment of this invention. In the drawings.

In general, the subject invention contemplates a viscometer assembly that is suitable for routine testing and comprises a constant temperature liquid bath, usually with means for heating the liquid, a very accuraate thermostat for controlling that heat input, to maintain a temperature of 100° to 210° F. within about 0.05° F., a stirrer to insure constant temperature throughout the bath, and the improved viscometer tube proper with supporting and aligning means for the same. An auxiliary source of reduced pressure, such as a vacuum pump, or a hand operated rubber bulb, with a flexible hose for selective attachment to the top of the tube is also required, as will be outlined below. No pipette or the like is needed as heretofore, as the tube is arranged to receive the sample directly from its original container or sample bottle.

Figure 1:
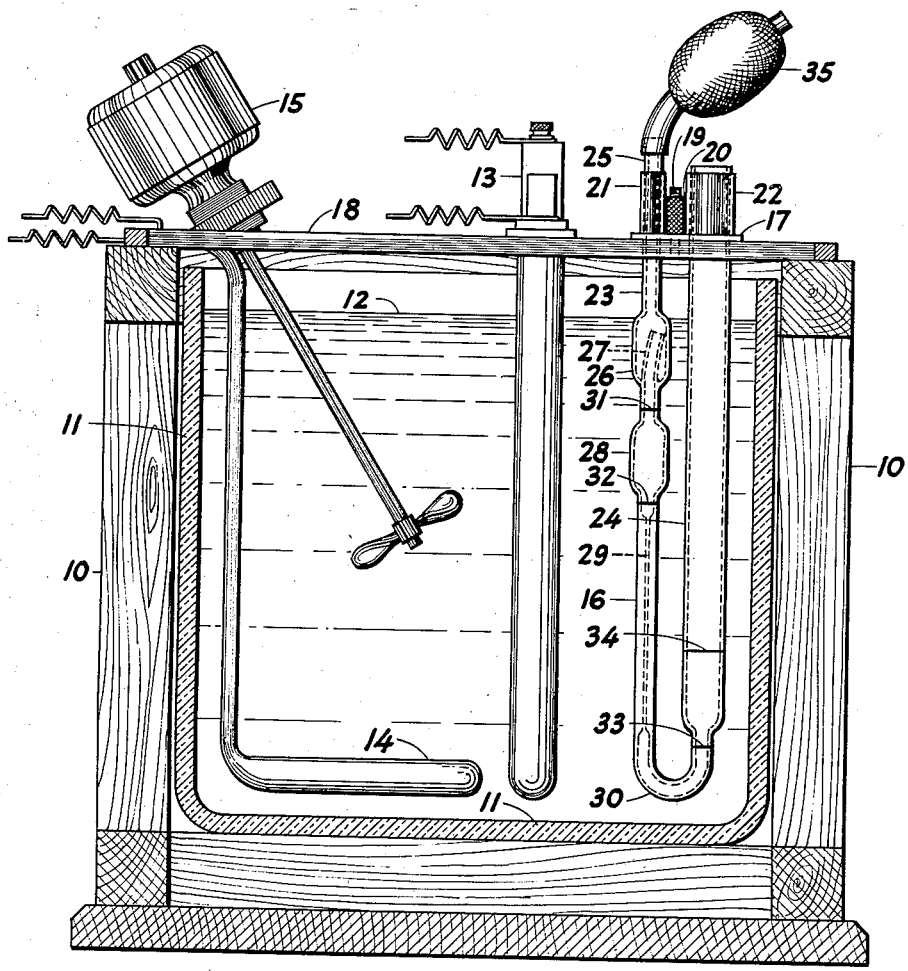
Figure 1 is a side view, partially in elevation and partially in longitudinal section, of a viscometer assembly embodying this invention.
Figure 2:
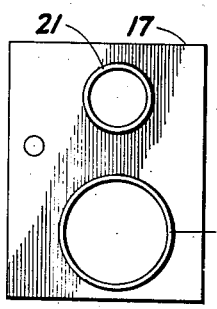
Figure 2 is a plan and Figure 3 is a side elevation view of the tube supporting and leveling member shown in Figure 1.
Figure 3:
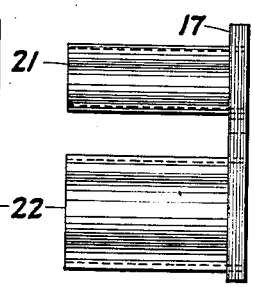

In Figure 1 of the drawings, which shows the general arrangement just outlined, the numeral 10 represents an open or skeleton frame adapted to hold a glass or other transparent container 11 for the constant temperature liquid bath 12, which may be a transparent refined petroleum oil somewhat heavier than kerosene, such as mineral seal. An accurate thermostat 13 is adapted to control the electric current input to the heater 14, as is customary with apparatus of this type. A small motor driven stirrer 15 is provided to keep the liquid 12 in motion, so that the temperature of the latter will be constant throughout the container, and will give adequate heat transfer to samples of liquid to be tested in the glass viscometer tube generally designated 16.

Tube 16 is supported to be truly vertical by means such as a holder 17, adapted to encircle the two legs of the tube, and to be detachably secured to a horizontal element or lever bar 18, which extends across frame 10 and bath 12, as by a threaded stud 19 and a knurled nut 20. Thus the use of plumb bobs and the like heretofore employed to level the tube is avoided, the tube 16 is maintained in a truly vertical position, and is easily removable for cleaning. In addition, the two holder sleeves 21 and 22 at the top of tube 16, preferably cemented thereto as by a paste of litharge and glycerine, serve to reinforce the top of the two legs 23 and 24, respectively, to prevent or at least minimize breakage.

Referring again to Figures 1 and 4, which show the general structure and the dimensional details, respectively, of tube 16, it will be noted that the smaller diameter leg 23 extends a short distance above holder sleeve 21 as at 25, so that a source of reduced pressure, such as a vacuum pump or hand operated rubber bulb may be attached as will be explained below. Below the holder 17 and preferably below the surface of bath 12 the leg 23 is expanded to form a generally cylindrical bulb 26. An overflow tip or nozzle 27 extends upwardly into bulb 26 and is preferably bent as shown to avoid breakage by the insertion of a suction tube used to withdraw the excess remaining from each sample through portion 25 of leg 23.

Figures 4, 5:
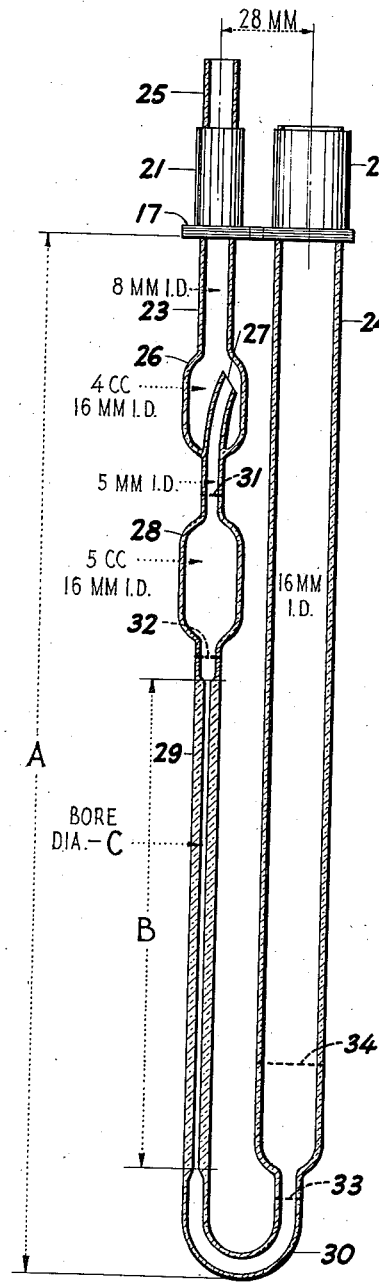
Figure 4 is a vertical sectional view of the viscometer tube shown in Figure 1.
Figure 5 is a table showing certain dimensions for the tube of Figure 4 to make it more adaptable to liquids of specific viscosity ranges.

Immediately below bulb 26 the leg 23 extends downwardly to a second generally cylindrical bulb 28. Below bulb 28, leg 23 is restricted to substantialy capillary dimensions as at 29 for a length depending upon the viscosity for which the viscometer tube 16 is designed. Detailed dimensions found to be suitable for three generally used ranges are shown in the table of Figure 5. Below the capillary section 29 the leg 23 enlarges again to substantially its original diameter, and is bent in a U shape at 30, to connect with the large diameter leg 24, the latter extending upwardly to be received in sleeve 22 of holder 17. The diameter of leg 24 is preferably large enough so that a sample may be poured directly thereinto from a sample bottle without smearing the walls, thus obviating the necessity for the long and easily breakable charging pipettes heretofore used. The general cylindrical shape of bulbs 26 and 28 is desirable to facilitate the rapid drainage of liquid from the walls at these points.

Four horizontal index marks are etched or otherwise marked on the glass of tube 16 and are respectively designated 31, between bulbs 26 and 28; 32, below bulb 28 and substantially at the upper end of capillary section 29; 33, in the section of 30 below its point of connection with leg 24; and 34, a short distance above the lower end of large diameter leg 24. It will be noted, from the detailed drawings of Figures 4 and 5, that the inside diameter of bulbs 26 and 28 are the same as that of large leg 24, to eliminate errors due to surface tension. The other proportions are preferably such that the aggregate volume of the lower bulb 28, the capillary 29 and the U bend 30 connecting the small with the large diameter tube are substantially equal to the volume of the sample being tested, whereby both exposed areas of the sample of oil are the same, while the measurements are being made. Thus, as the meniscus passing downwardly in tube 23 enters the increased diameter section of bulb 28, the upwardly moving meniscus in the opposite leg will simultaneously enter the enlarged portion of leg 24.

In operation, the previously cleaned viscometer tube 16 is clamped in bath 12 by means of holder 17, and, by virtue of the lever bar 18 on which holder 17 is secured, is thus accurately vertically positioned. The sample to be tested is poured into the large diameter leg 24 of tube 16 until the meniscus in that leg stand at index 34. The sample is then sucked up into leg 23 by means of rubber bulb 35 until the meniscus in that leg is between index 31 and the top of overflow nozzle 27. The sample is thereupon forced back into the large leg 24 by means of bulb 35. These operations are repeated several times to insure temperature equilibrium in the sample. The exact volume of the sample to be used in the test is fixed by sucking the sample upwardly into leg 23 until the meniscus stands at index 33 in leg 24. Excess sample liquid overflows through nozzle 27 into the lower or trapped portion of bulb 26, from which it may be removed by a suction tube of the usual type before the next sample is tested.

The measured sample is now permitted to flow under its own hydrostatic head from leg 23 into leg 24, through capillary section 29, and the time which is required for the meniscus in leg 23 to pass from index 31 to index 32 is taken by a stopwatch or other means. The kinematic viscosity, expressed or converted into any suitable standard units, such as Saybolt universal seconds (S. S. U.), is then read from a kinematic viscosity-time chart, which has previously been prepared for the instrument by means of standard liquids of known viscosity.

The observations of the meniscus just outlined are readily made through the transparent receptacle 11 and liquid bath 12. If desired, the apparatus may be placed at about eye level in a window or strong light, or a source of illumination such as an electric lamp, may be placed near the frame 10 on the opposite side from the observer. It is likewise obvious that a plurality of viscometer tubes may be supported from level bar 18 and be served by the same constant temperature bath and its accessories.

Thus it will be appreciated that a new and improved form of kinematic viscometer has been disclosed, suitable for routine laboratory and process control, and so arranged and constructed that the previous steps of leveling the tube by a plumb bob, accurately measuring the sample before its introduction, and those other disadvantages inherent in prior art devices, have been eliminated. Although a specific embodiment of this invention has been described and illustrated, it is to be understood that modifications and changes could be made in it and its environment without departing from that invention and all such that fall within the scope of the appended claims are embraced thereby.

I claim:

1. In combination, a viscometer tube of the Ostwald type comprising a U shaped glass tube having a large diameter leg and a small diameter leg, a metal sleeve secured to each of said legs substantially at the upper ends thereof, and a metal plate connecting said sleeves and adapted to be secured to a support to hold said tube in a vertical position.

2. A viscometer of the Ostwald type comprising a small diameter tube forming one leg of said viscometer, an upper bulb in said tube, an overflow nozzle extending upwardly into said bulb to form a liquid trap therewith, a lower bulb in said tube, a capillary section below said lower bulb, and a large diameter tube forming the other leg of said viscometer, said last named tube being of uniform configuration and substantially the same diameter as said lower bulb.

3. A viscometer of the Ostwald type, according to claim 2, in which said large diameter tube is so proportioned that a liquid sample may be poured directly thereinto from its original container.

4. A viscometer of the Ostwald type, according to claim 2, in which said overflow nozzle is inclined toward one wall of said upper bulb so that liquid trapped therein may be readily be removed through the upper portion of said tube.

5. A viscometer of the Ostwald type, according to claim 2, in which said lower bulb is substantially cylindrical in configuration.

6. A viscometer of the Ostwald type, according to claim 2, in which the aggregate volume of the lower bulb, the capillary below the same and the small tube below the capillary connecting the same to the large diameter tube is substantially equal to the volume of the sample being measured, and the cross-sectional areas of said lower bulb and said large diameter tube are substantially the same, so that the respective areas of the menisci remain equal during the flow of said sample.

7. A viscometer of the Ostwald type comprising a small diameter tube forming one leg of said viscometer, an enlargement in the upper end of said tube, a liquid trap in said enlargement, a bulb in said tube below said enlargement, a capillary section below said bulb, and a large diameter tube forming the other leg of said viscometer, said last named tube being of uniform configuration and substantially the same diameter as said lower bulb.

8. A viscometer of the Ostwald type comprising a small diameter tube forming one leg of said viscometer, a bulb in said tube, a liquid trap above said bulb, a capillary section below said bulb, and a large diameter tube forming the other leg of said viscometer, said last named tube being of substantially uniform configuration and substantially the same diameter as said bulb.

EDWARD H. ZEITFUCHS.